US008087066B2

(12) United States Patent
Belgaied et al.

(10) Patent No.: US 8,087,066 B2
(45) Date of Patent: Dec. 27, 2011

(54) METHOD AND SYSTEM FOR SECURING A COMMERCIAL GRID NETWORK

(75) Inventors: Kais Belgaied, Sunnyvale, CA (US); Darrin P. Johnson, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 1293 days.

(21) Appl. No.: 11/786,541

(22) Filed: Apr. 12, 2007

(65) Prior Publication Data

US 2008/0256603 A1  Oct. 16, 2008

(51) Int. Cl.
*G06F 7/04* (2006.01)

(52) U.S. Cl. .................................. 726/3; 726/4

(58) Field of Classification Search ............. 726/3, 4, 726/1; 709/229, 223; 713/168
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,163,539 A | 12/2000 | Alexander et al. | |
| 6,477,643 B1 | 11/2002 | Vorbach et al. | |
| 6,516,350 B1 * | 2/2003 | Lumelsky et al. | 709/226 |
| 6,600,721 B2 | 7/2003 | Edholm | |
| 6,643,650 B1 * | 11/2003 | Slaughter et al. | 1/1 |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,146,496 B2 * | 12/2006 | Circenis et al. | 713/100 |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 7,380,129 B2 * | 5/2008 | Keohane et al. | 713/185 |
| 7,584,274 B2 * | 9/2009 | Bond et al. | 709/223 |
| 2003/0018786 A1 * | 1/2003 | Lortz | 709/226 |
| 2003/0037154 A1 | 2/2003 | Poggio et al. | |

(Continued)

FOREIGN PATENT DOCUMENTS

EP  1607862 A2 * 12/2005

OTHER PUBLICATIONS

Demonstration of Advanced Reservation and Services; DataTAG-D2.5-1.5 Draft; Information Society; Feb. 27, 2004; pp. 1-34; Retrieved Date Oct. 15, 2010.*

(Continued)

*Primary Examiner* — Samson Lemma
(74) *Attorney, Agent, or Firm* — Osha • Liang LLP

(57) ABSTRACT

A method for securing a commercial grid network involves receiving a lease request from a client to lease a computing resource selected from multiple computing resources in the commercial grid network, mapping a unique identifier of the client to a security label selected from multiple unmapped security labels to obtain a client-label mapping based on the lease request, mapping a unique identifier of the computing resource to the security label to obtain a resource-label mapping based on the lease request, storing the client-label mapping and the resource-label mapping in a security label repository to obtain stored security label mappings, and authenticating, by the commercial grid network, an access request from the client to the computing resource using the stored security label mappings.

13 Claims, 5 Drawing Sheets

U.S. PATENT DOCUMENTS

| | | |
|---|---|---|
| 2004/0267866 A1 | 12/2004 | Carollo et al. |
| 2005/0076173 A1* | 4/2005 | Merril et al. ............... 711/100 |
| 2005/0111455 A1 | 5/2005 | Nozue et al. |
| 2005/0135243 A1 | 6/2005 | Lee et al. |
| 2005/0138620 A1 | 6/2005 | Lewites |
| 2005/0240765 A1* | 10/2005 | Genty et al. ............... 713/175 |
| 2006/0041667 A1 | 2/2006 | Ahn et al. |
| 2006/0045089 A1 | 3/2006 | Bacher et al. |
| 2006/0070066 A1 | 3/2006 | Grobman |
| 2006/0174324 A1 | 8/2006 | Zur et al. |
| 2007/0112786 A1* | 5/2007 | Shin et al. ............... 707/10 |
| 2007/0300297 A1* | 12/2007 | Dawson et al. ............... 726/22 |

OTHER PUBLICATIONS

Grid Network Security; Anirban Chakrabarti; May 26, 2007; XP002509887; XP002509887; Retrieved Date Oct. 15, 2010.*

Security of Grids; Marty Humphrey; Mar. 2005 IEEE; vol. 93, No. 3, Retrieved Date Oct. 15, 2010.*

Tripathi, S.; "Solaris Networking—The Magic Revealed (Part I)"; Sunay Tripathi's Solaris Networking Weblog; Nov. 14, 2005, pp. 1-22 (22 pages).

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

* cited by examiner

METHOD AND SYSTEM FOR SECURING A COMMERCIAL GRID NETWORK

BACKGROUND

When computer systems are arranged in a network, security of data transferred between the computer systems can be of considerable concern, especially when the data is sensitive and/or proprietary. Specific security concerns may depend on the type(s) of network used (e.g., wireless, point-to-point, Ethernet, etc.), the type(s) of computer systems in the network (e.g., servers, workstations, mobile devices, integrated devices, etc.), and/or the types of applications executing on the computer systems (e.g., web servers, terminal servers, peer-to-peer applications, email servers, etc.). Those skilled in the art will appreciate that many different security concerns may affect security requirements in a computer network.

Security measures may be implemented from the physical layer all the way up to the application layer of the network. For example, at the physical layer, dedicated physical connections clearly provide stronger security than unencrypted wireless networks. Many of the network layers allow for some form of data encryption, which may be used to secure data regardless of the security provided by lower layers. Further, security may be implemented using packet filtering, firewalls, Virtual Private Networks (VPN), Secure Socket Layer (SSL), Wi-Fi Protected Access (WPA), antivirus suites, any other type of security feature, or any combination thereof. As noted above, the specific security features used may depend on many different security concerns.

One example of a security concern arises when three or more computer systems are connected in a network. In such arrangements, data sent by a first computer system may pass through a second computer system en route to a third computer system. If the second computer system is executing malicious code and the data is not adequately secured, the malicious code may be able to intercept the data and access its contents. This type of security breach may occur even when the physical links between the individual computer systems are fully secured.

SUMMARY

In general, in one aspect, the invention relates to a method for securing a commercial grid network. The method comprises receiving a lease request from a client to lease a computing resource selected from a plurality of computing resources in the commercial grid network, mapping a unique identifier of the client to a security label selected from a plurality of unmapped security labels to obtain a client-label mapping based on the lease request, mapping a unique identifier of the computing resource to the security label to obtain a resource-label mapping based on the lease request, storing the client-label mapping and the resource-label mapping in a security label repository to obtain stored security label mappings, and authenticating, by the commercial grid network, an access request from the client to the computing resource using the stored security label mappings.

In general, in one aspect, the invention relates to a commercial grid network. The commercial grid network comprises a plurality of computing resources, a security label repository configured to store a plurality of unmapped security labels, and an administrative node configured to receive a lease request from a client to lease a computing resource selected from the plurality of computing resources, map a unique identifier of the client to a security label selected from the plurality of unmapped security labels to obtain a client-label mapping based on the lease request, map a unique identifier of the computing resource to the security label to obtain a resource-label mapping based on the lease request, and store the client-label mapping and the resource-label mapping in the security label repository to obtain stored security label mappings. The commercial grid network further comprises a forwarding node configured to authenticate an access request from the client to the computing resource using the stored security label mappings.

In general, in one aspect, the invention relates to a computer readable medium. The computer readable medium comprises executable instructions for receiving a lease request from a client to lease a computing resource selected from a plurality of computing resources in the commercial grid network, mapping a unique identifier of the client to a security label selected from a plurality of unmapped security labels to obtain a client-label mapping based on the lease request, mapping a unique identifier of the computing resource to the security label to obtain a resource-label mapping based on the lease request, storing the client-label mapping and the resource-label mapping in a security label repository to obtain stored security label mappings, and authenticating, by the commercial grid network, an access request from the client to the computing resource using the stored security label mappings.

Other aspects of the invention will be apparent from the following description and the appended claims.

DETAILED DESCRIPTION

Figure 1:
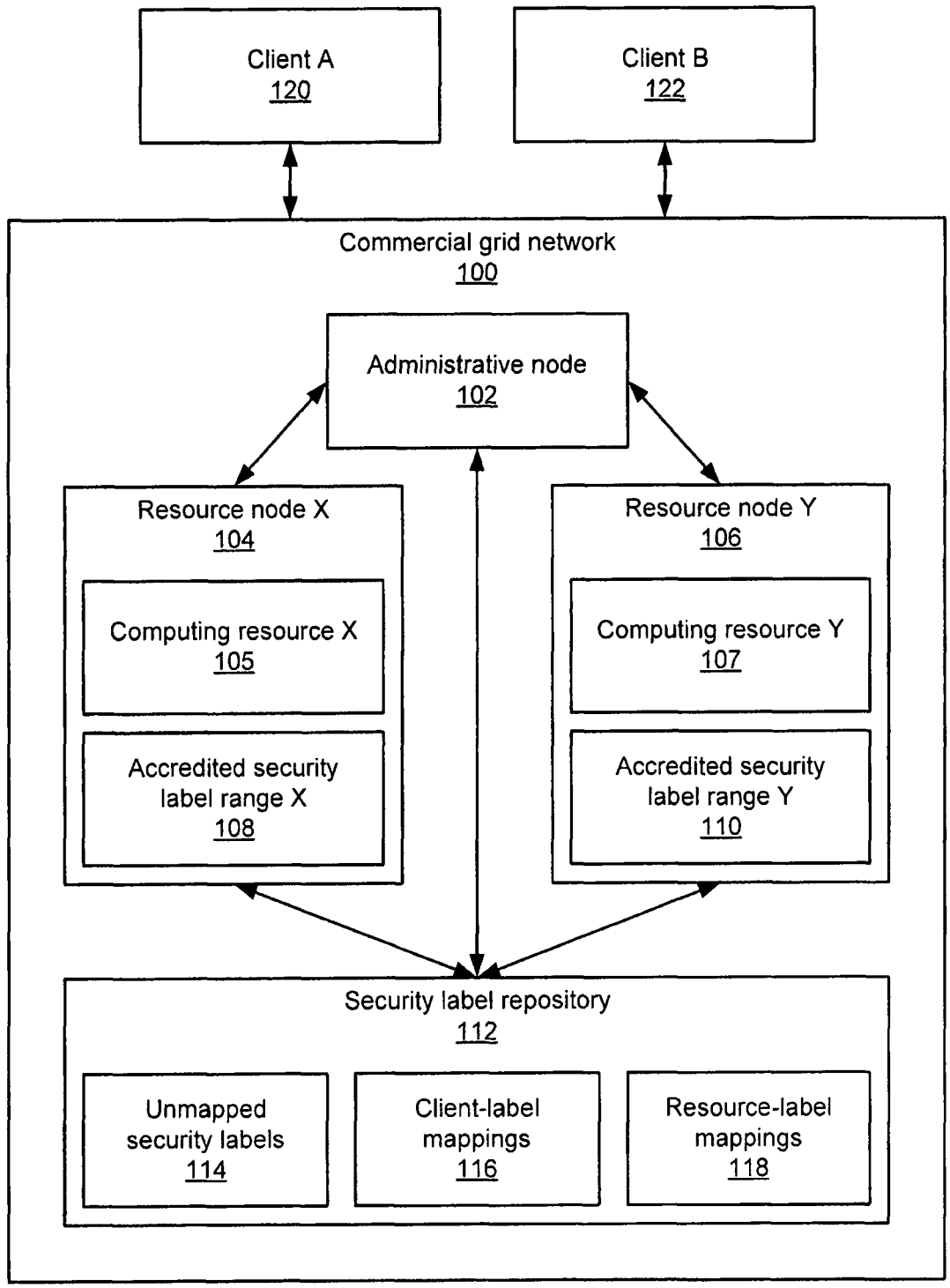
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for securing a commercial grid network. In one or more embodiments of the invention, computing resources in the commercial grid network are leased to clients. When a computing resource is leased to a client, unique identifiers of the computing resource and the client may each be mapped to the same unique security label. These mappings may then be used to authenticate requests from the client to access the computing resource.

In this context, the grid network is referred to as "commercial" because of the ability for clients to lease computing resources from the grid network. In other words, leasing computing resources is a type of commercial transaction. Further, "leasing" does not necessarily imply a financial transaction. For example, a client may gain access to computing resources in exchange for contributing computing resources to the grid network. As another example, a client may gain access to computing resources as part of a broader business agreement. Thus, in this context, "leasing" merely implies a transaction in which a party (i.e., the client) gains access to computing resources from the commercial grid network.

FIG. 1 shows a diagram of a system in accordance with one or more embodiments of the invention. The system includes a commercial grid network (100) configured to lease computing resources (e.g., computing resource X (105), computing resource Y (107)) to clients (e.g., client A (120), client B (122)). The computing resources may include data storage capacity, processing cycles, network bandwidth, any other type of leasable computing resource, or any combination thereof. The clients may be any type of computer system configured to communicate with the commercial grid network (100) and transmit requests to access leased computing resources.

The computing resources are hosted on resource nodes (e.g., resource node X (104), resource node Y (106)) in the commercial grid network (100). The resource nodes may include storage servers, tightly-coupled and/or loosely-coupled multiprocessor computer systems, web servers, network switches, proxy servers, any other type of computer system configured to host computing resources for leasing, or any combination thereof. Further, one or more of the resource nodes may host multiple computing resources, and multiple computing resources may be leased independently and/or as a group. In one or more embodiments, blade servers are used as resource nodes to extend computing capacity of the commercial grid network (100) with minimal physical space requirements.

In one or more embodiments, the computing resources may include virtualized computing resources. Specifically, one or more of the computing resources may provide a level of abstraction to underlying computing resources. For example, the underlying computing resources may be aggregated, spanned, or otherwise combined to form one or more virtual computing resources. Alternatively, a single underlying computer resource may be partitioned into multiple virtual computing resources. Further, one or more of the computing resources may be hosted on a virtual machine, i.e., a virtual computer system consisting wholly of virtual computing resources.

In one or more embodiments, communication between clients and resource nodes is protected using security labels. Security labels are unique identifiers that are mapped to clients and resource nodes. The identifiers may include numbers, letters, symbols, or any combination thereof. Further, the identifiers may be encrypted. To communicate data securely, the data headers in the packets used to communicate between the clients and the resource nodes are examined by a forwarding node(s), and if the security label is absent or invalid, then the data is rejected. A method for securing a commercial grid network using security labels is discussed in detail below with respect to FIGS. 2A-2B.

Continuing with discussion of FIG. 1, in one or more embodiments, the commercial grid network (100) includes an administrative node (102) configured to administer security label mappings for clients and resource nodes. In one or more embodiments, the administrative node (102) is configured to access and modify unmapped security labels (114), client-label mappings (116), and resource-label mappings (118) stored in a security label repository (112). In one or more embodiments, the administrative node (102) is further configured to manage grid enrollment for clients—e.g., authenticating clients to use the commercial grid network (100) and/or choosing which computing resources to allocate in response to lease requests from clients.

In one or more embodiments, client-label mappings (116) are mappings of security labels to unique identifiers of clients. Similarly, resource-label mappings (118) are mappings of security labels to unique identifiers of resource nodes. Unique identifiers may include Internet Protocol (IP) addresses, Media Access Control (MAC) addresses, processor identifiers, login credentials, any other type of unique identifier, or any combination thereof.

The security label repository (112) may be any type of storage location configured to store security label-related data. For example, the security label repository (112) may be a database, an extensible markup language (XML) file, a plain text file, any other type of storage location, or any combination thereof. In one or more embodiments, unmapped security labels (114), client-label mappings (116), and/or resource-label mappings (118) are stored in different locations. Further, multiple types of storage locations may be used. For example, unmapped security labels (114) may be stored in an XML file while client-label mappings (116) and resource-label mappings (118) are stored in a database. Those skilled in the art will appreciate that many different ways of storing data exist.

Although a single administrative node (102) is shown in FIG. 1, the commercial grid network (100) may include multiple administrative nodes. Further, the commercial grid network (100) may include multiple security label repositories. For example, redundant security label repositories may be distributed across the commercial grid network (100) for access by administrative nodes and/or resource nodes. In one or more embodiments, security label repositories are stored on the administrative node(s) themselves. Further, copies of unmapped security labels (114), client-label mappings (116), and/or resource-label mappings (118) may be stored on the resource nodes for fast access when authenticating communications. In one or more embodiments, changes to the security label repository (112) are made on the administrative node (102) first, and then propagated throughout the commercial grid network (100).

As noted above, security labels may be used to authenticate communications between clients and/or resource nodes. Specifically, in one or more embodiments, each resource node includes an accredited security label range (e.g., accredited security label range X (108), accredited security label range Y (110)). Accredited security label ranges define the upper and lower boundaries of security labels that are authorized to access a given resource node (and, consequently, computing resources hosted on the resource node).

For example, suppose accredited security label range X (108) defines a lower security label boundary of B11 and an upper security label boundary of D42. In this case, data arriving with a security label of C17 would be accepted, but data arriving with a security label of F98 would be rejected. The aforementioned label ranges are provided as a simplified example only, and should not be construed as limiting the scope of the invention in any way.

Further, security labels may be used by forwarding nodes communicatively located between clients and/or resource nodes to authenticate data being forwarded. Specifically, forwarding nodes may compare the security labels mapped to the data origin (e.g., a specific client) and data destination (e.g., a specific resource node). If the data origin and data destination have the same security label, then the data is forwarded to the next node (i.e., the data destination or another forwarding node). In one or more embodiments, administrative nodes and/or resource nodes also act as forwarding nodes.

Whether or not a node is configured as a forwarding node may depend on various properties of the node, such as networking capacity, processing power, whether the node has been reserved for another use, or any other factor that may affect a node's suitability for forwarding data. In one or more embodiments, forwarding capabilities are restricted only to those nodes executing a trusted operating system. Specifically, in one or more embodiments, only operating systems that include kernel-level security label authentication capabilities are considered trusted operating systems.

For example, Trusted Solaris™ (or Solaris™ executing Solaris™ Trusted Extensions™) may be considered a trusted operating system, because Trusted Solaris™ includes trusted label encodings. In Trusted Solaris™, trusted label encodings may be mapped to IP addresses (i.e., in the "tnrhdb" database), and access to a given instance of Trusted Solaris™ may be restricted to a specific label range. Alternatively, any other operating system providing security label functionality, or any combination thereof, may be used. Solaris™, Trusted Solaris™, and Solaris Trusted Extensions™ are trademarks of Sun Microsystems, Inc., located in Palo Alto, Calif. Detailed discussion of trusted label encodings in Trusted Solaris™ can be found in "Trusted Solaris Label Administration," published by Sun Microsystems, Inc., the entire contents of which are incorporated herein by reference.

Figure 2A:
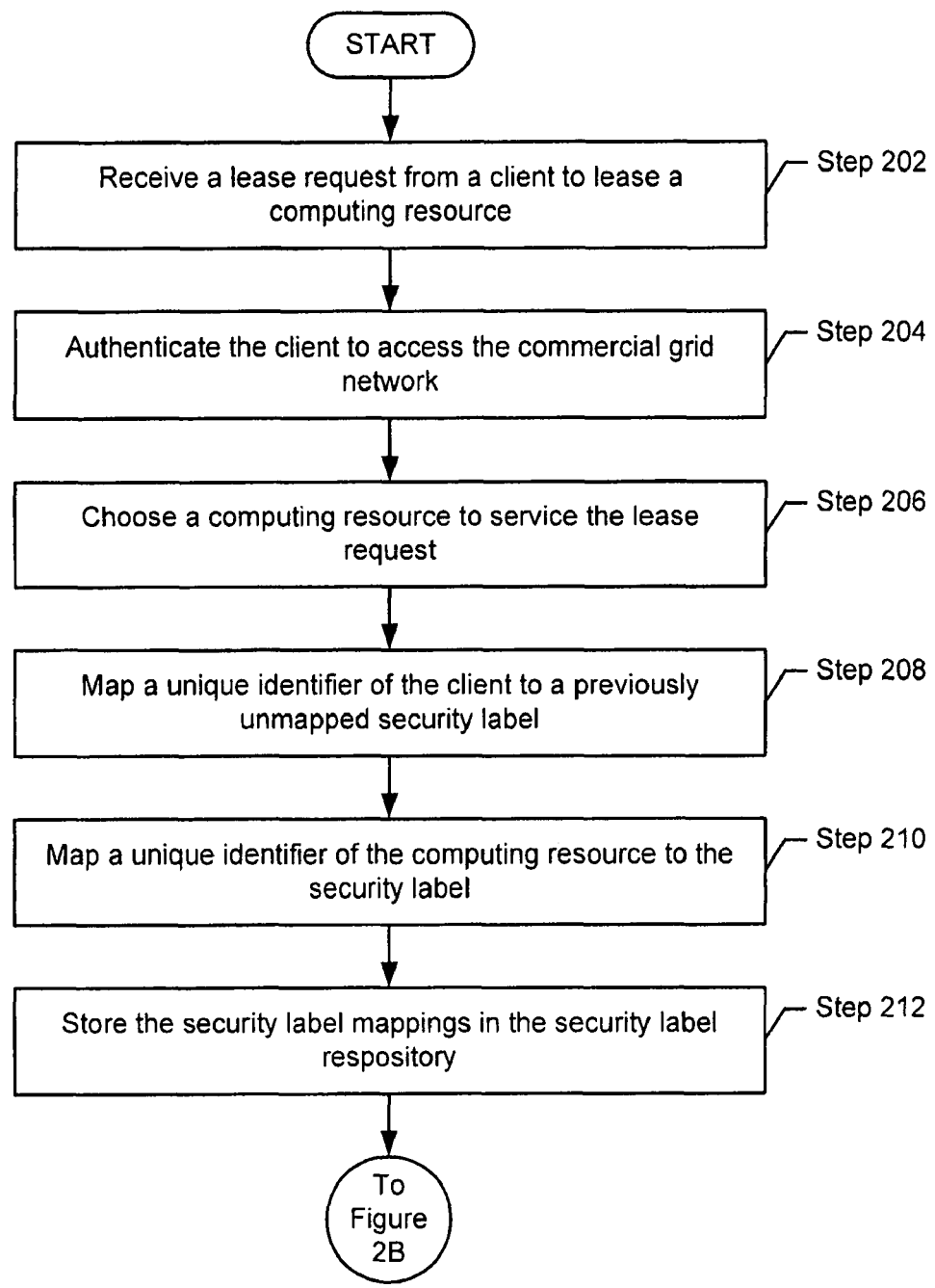
FIGS. 2A-2B show a flowchart of a method for securing a commercial grid network in accordance with one or more embodiments of the invention.
Figure 2B:
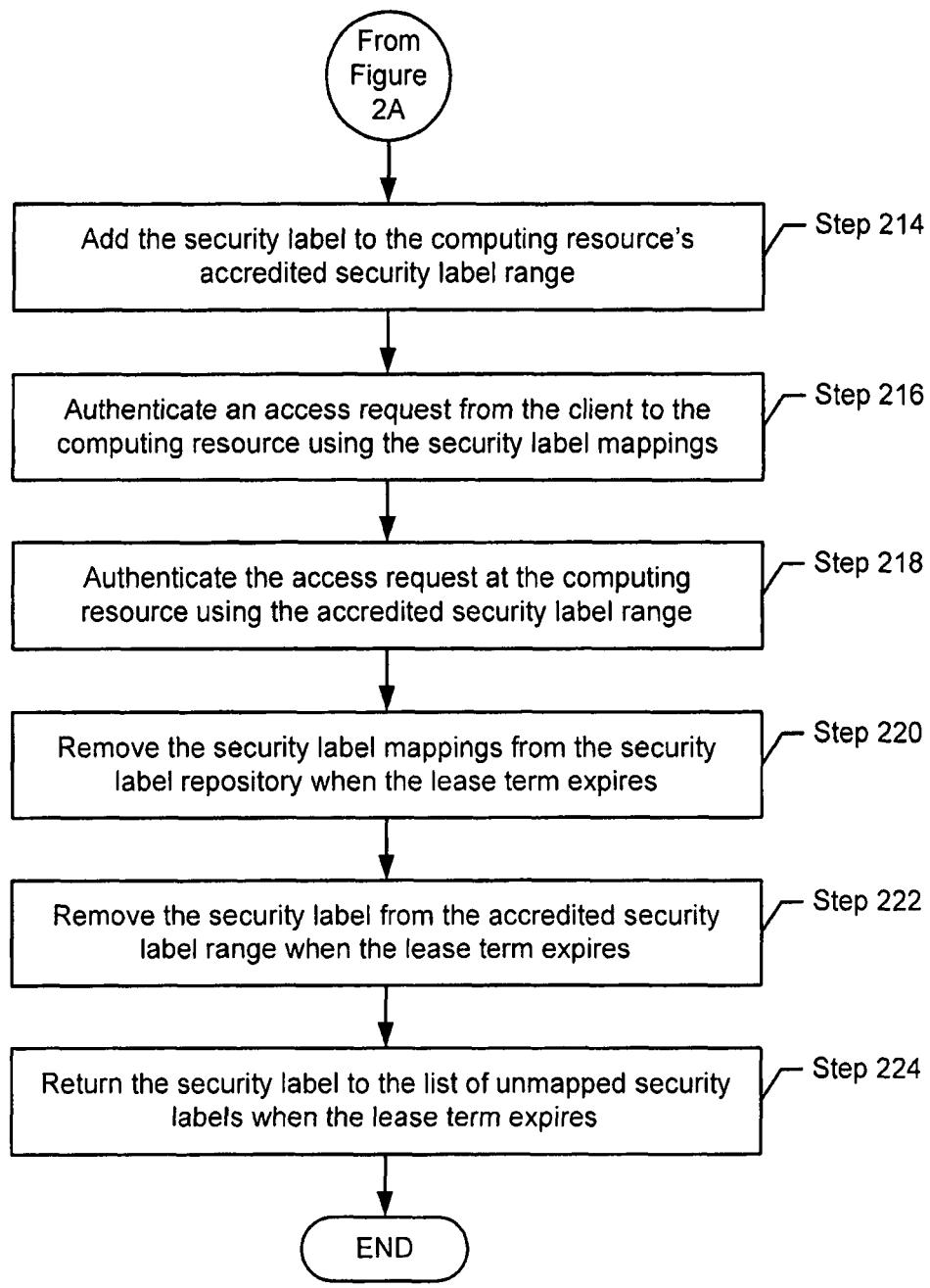

FIGS. 2A-2B show a flowchart of a method for securing a commercial grid network in accordance with one or more embodiments of the invention. In one or more embodiments, one or more of the steps shown in FIGS. 2A-2B may be omitted, repeated, and/or performed in a different order than that shown in FIGS. 2A-2B. Accordingly, the specific arrangement of steps shown in FIGS. 2A-2B should not be construed as limiting the scope of the invention.

Initially, in Step 202, a lease request is received from a client of the commercial grid network. In one or more embodiments, the lease request may include details about the type of computing resource(s) requested, such as a number of central processing unit (CPU) hours, a number of gigabytes (GB) of storage, a number of ports t6 reserve on a switch, or any other type of computing resource metric, or any combination thereof. Further, the lease request may specify a term of the lease, i.e., a range of dates and/or times during which the computing resource(s) are to be leased. In one or more embodiments, the lease request is received by an administrative node in the commercial grid network.

In one or more embodiments, prior to servicing the lease request, the client itself must be authenticated to access the commercial grid network (Step 204). In such scenarios, the lease request may include login credentials and authenticating the client may involve comparing the login credentials to a database of authorized login credentials. Further, if the lease request includes payment information (e.g., a credit card number), authenticating the client may involve confirming that the payment information is valid.

In Step 206, one or more computing resources are chosen to service the client's lease request. For example, the administrative node may attempt to locate a resource node hosting the type and capacity of computing resource(s) requested. In some cases, computing resources on multiple resource nodes may be combined to collectively satisfy the criteria specified in the lease request. In one or more embodiments, the computing resource(s) are then removed from the pool of available resources in the commercial grid network.

In Step 208, a unique identifier of the client is mapped to a previously unmapped security label. In one or more embodiments, the administrative node processing the lease request accesses the security label repository to select an unmapped security label. The administrative node then creates a client-label mapping in the security label repository, mapping the client's unique identifier to the selected security label. In one or more embodiments, the selected security label is then marked as mapped, to prevent it from being reused while mapped to the client. In Step 210, a unique identifier of a resource node servicing the client's lease request is mapped to the same security label as the client.

In Step 212, the client-label mapping generated in Step 208 and the resource-label mapping generated in Step 210 are both stored in the security label repository. If the security label repository is a database that supports Structured Query Language (SQL), one or more of Steps 208, 210, and 212 may be performed simultaneously. For example, a query to link the client's unique identifier to the security label in a database table would result in both generating and storing a client-label mapping.

As discussed above with respect to FIG. 1, security label ranges may be used to secure access to resource nodes. Accordingly, in Step 214, security label ranges of one or more resource nodes servicing the client's lease request may be updated. In some cases, the client's lease request may be a request for exclusive access to a computing resource on a resource node. Exclusive access to the computing resource may be enforced by restricting the resource node's security label range to the client's security label (i.e., the security label mapped in Step 208)—that is, the resource node's upper and lower security label boundaries may both be set to the value of the client's security label. Thus, only the client is authorized to access the resource node (although exceptions for system administrators may also exist).

After security label mappings (i.e., client-label mapping and resource-label mapping) are stored for the client and the resource node, an access request from the client to the resource node may be authenticated using the security label mappings (Step 216). Specifically, forwarding nodes between the client and the resource node may decide whether to forward the access request based on the security label mappings.

In one or more embodiments, authentication is performed by accessing a data header accompanying the access request, to obtain the client's IP address and the resource node's IP address (or any other type of unique identifier, depending on the specific implementation of security label mappings). The security label repository is then accessed to obtain the security label mappings for the client and the resource node, based on their respective IP addresses. If the client-label mapping and the resource-label mapping are identical, then the data is forwarded. Specifically, the fact that the security label mappings are identical indicates that the client has been authorized to make requests to the resource node.

In one or more embodiments, the first time the access request is authenticated by a forwarding node in the commercial grid network, the forwarding node places the appropriate security label in the access request's data header. Thus, subsequent forwarding nodes may also compare the security label mappings with the security label in the data header. In this case, even if malicious code were to obtain the client's IP address and the resource node's IP address, the malicious code could not successfully issue an access request to the resource node without also knowing the correct security label. In one or more embodiments, security labels are encrypted to prevent such incursions. Thus, placing the security label in the data header provides an additional assurance of secure communication.

Further, when the data arrives at the resource node, the resource node itself may authenticate the access request using the accredited security label range designated in Step 214. Specifically, the resource node may access the client-label mapping in the security label repository and/or the security label in the data header (if one exists), to determine whether the access request satisfies the accredited security label range. If the client's and/or data header's security label is outside the accredited security label range, then the access request is rejected.

In one or more embodiments, security label mappings are only valid for the term of the particular lease for which they were created. Accordingly, in Step 220, when the lease term expires, the corresponding client-label mapping and resource-label mapping may be removed from the security label repository. Further, in Step 222, the resource node's accredited security label range may be updated to no longer include that particular security label. Step 220 and/or Step 222 ensure that the client can no longer successfully issue access requests to the resource node after the lease term expires. However, in one or more embodiments, the commercial grid network is configured to reuse released security labels for subsequent leases. Accordingly, in Step 224, the security label may be returned to the list of unmapped security labels.

Figure 3:
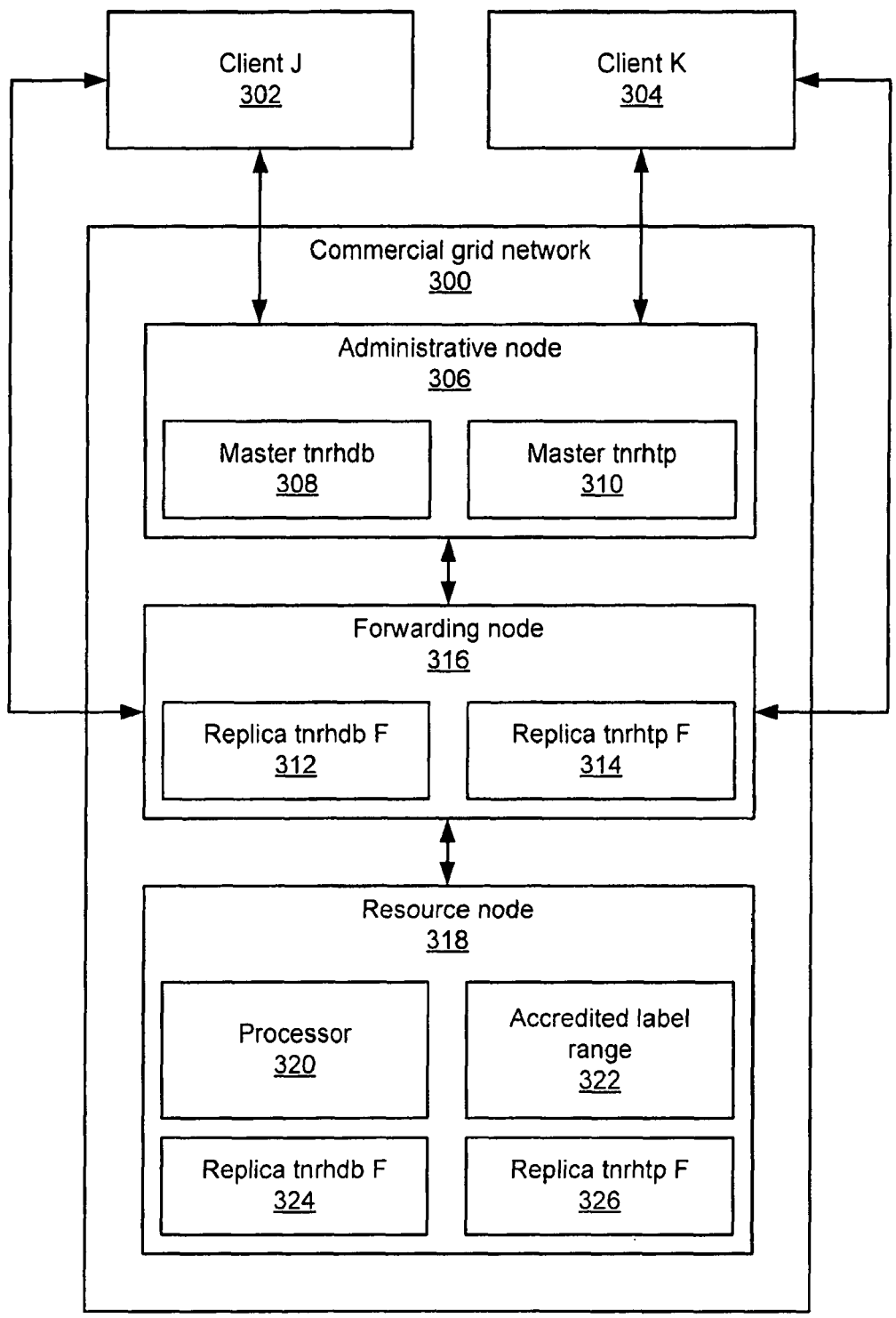
FIG. 3 shows a diagram of an example of securing a commercial grid network in accordance with one or more embodiments of the invention.

Referring now to FIG. 3, the following describes an example of securing a commercial grid network in accordance with one or more embodiments of the invention. In this example, terminology relating to Trusted Solaris™ is used, which differs slightly from the more general terminology used above. For example, Trusted Solaris™ uses the term "label" rather than the term "security label." Those skilled in the art will appreciate that Trusted Solaris™ terminology is used below merely for consistency with existing Trusted Solaris™ documentation, and should not be construed as limiting the scope of the invention in any way.

As shown in FIG. 3, a resource node (318) including a processor (320) is located in a commercial grid network (300). The resource node (318) is executing Trusted Solaris™ and accordingly includes an accredited label range (322). Initially, the accredited label range (322) excludes any non-administrative labels. An administrative node (306) is also located in the commercial grid network (300), and is also executing Trusted Solaris™. The commercial grid network (300) includes a master tnrhdb (308) and a master tnrhtp (310). In Trusted Solaris™, tnrhdb and tnrhtp are the names given to databases used to manage labels in a trusted network.

In this example, the resource node (318) is located away from the communicative edge of the commercial grid network (300). Specifically, any communication to and from the resource node (318) must pass through a forwarding node (316). The forwarding node (316) is also executing Trusted Solaris™.

Because the forwarding node (316) and the resource node (316) are both executing Trusted Solaris™, each includes a replica tnrhdb (i.e., replica tnrhdb F (312), replica tnrhdb R (324)) and a replica tnrhtp (i.e., replica tnrhtp F (314), replica tnrhtp F (326)), which have been propagated across the commercial grid network (300) from the master tnrhdb (308) and the master tnrhtp (310).

Initially, client J (302) issues a lease request to the administrative node (306), to lease 24 hours of processing time. The administrative node (306) authenticates client J (302) and then designates the processor (320) to service the access request. Specifically, the administrative node (306) creates entries in the master tnrhdb (308) and the master tnrhtp (310) mapping client J (302) and the resource node (318) to the same label. Further, the accredited label range (322) is updated to include the same label. The new mappings are then propagated from the master tnrhdb (308) and the master tnrhtp (310) to replica tnrhdb F (312), replica tnrhdb R (324)), replica tnrhtp F (314), and replica tnrhtp F (326).

When client J (302) issues an access request to the resource node (318), the access request passes through the forwarding node (316). Based on the origin and destination IP addresses in the access request, the forwarding node (316) obtains the corresponding label mappings from its replica tnrhdb (312) and replica tnrhtp (314). The forwarding node (316) determines that client J (302) and the resource node (318) are mapped to the same label, and therefore forwards the access request to the resource node (318). Prior to forwarding the access request, the forwarding node (316) places the label in the access request's data header.

When the resource node (318) receives the access request, the resource node (318) retrieves the label from the data header and compares the label to the accredited label range (322). Because the accredited label range (322) was updated to include the label, the access request is authorized and the resource node (318) processes the access request.

At any time during client J's (302) lease term, access requests from client K (304) to the resource node (318) would be rejected. Specifically, the forwarding node (316) would recognize that the replica tnrhdb (312) does not include a mapping of client K's (304) IP address to the same label as the resource node (318). Thus, the forwarding node (316) knows that client K (304) has not been authorized to access the resource node (318).

One or more embodiments of the invention allow communication in a commercial grid network to be secured using kernel-level security label authentication. Specifically, embodiments of the invention allow for the creation of a trusted commercial grid environment in which clients are assured that their access requests cannot be spoofed and their leased computing resources cannot be compromised by unauthorized clients.

Figure 4:
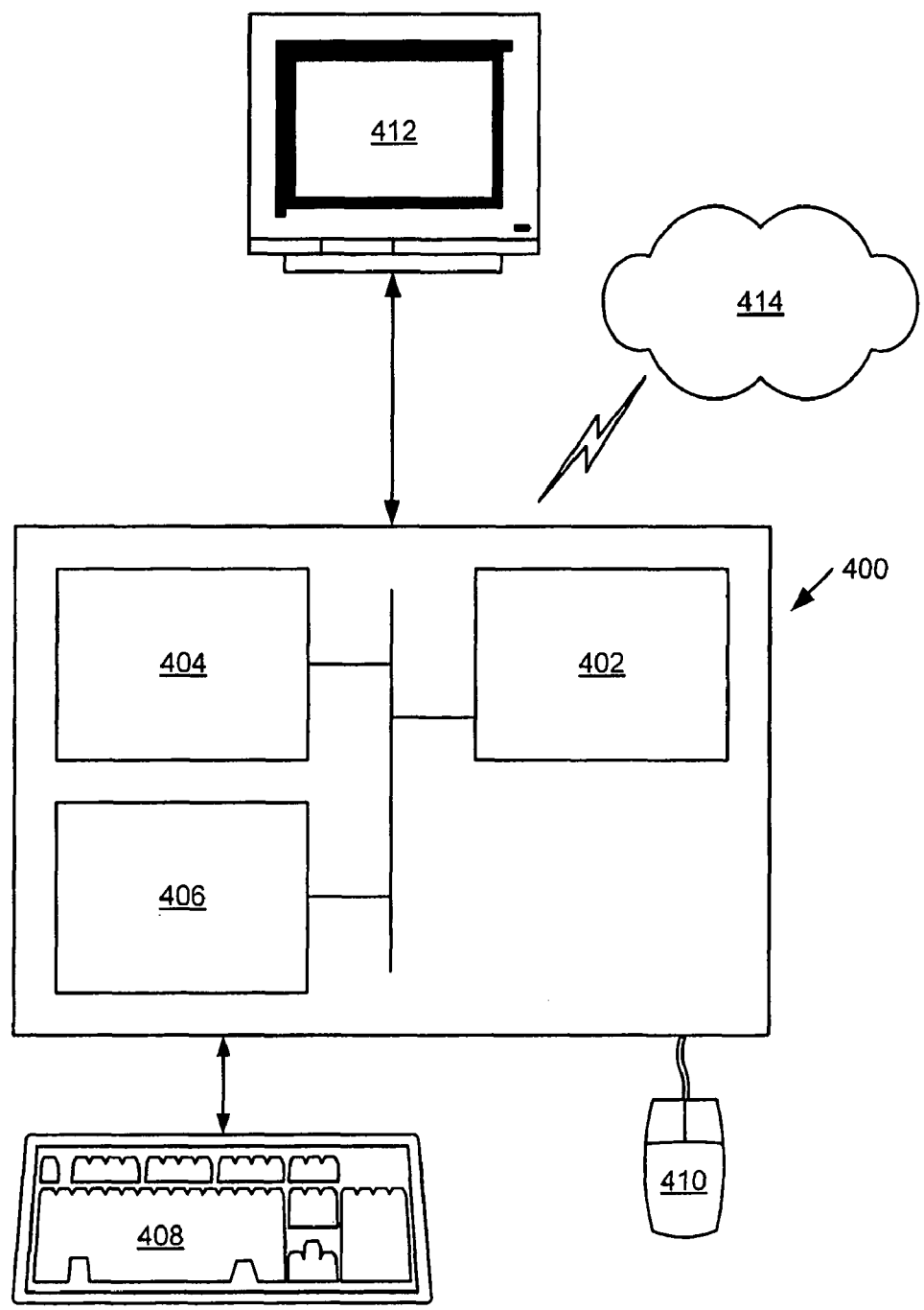
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) may be connected to a network (414) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., client, administrative node, resource node, security label repository, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A commercial grid network comprising:
   a plurality of computing resources;
   a security label repository configured to store a plurality of unmapped security labels;
   an administrative node comprising a processor and memory, wherein the memory comprises software instructions, which when executed by the processor, perform a method, the method comprising:
      receiving a lease request from a client to lease a computing resource selected from the plurality of computing resources,
      mapping a unique identifier of the client to a security label selected from the plurality of unmapped security labels to obtain a client-label mapping based on the lease request,
      mapping a unique identifier of the computing resource to the security label to obtain a resource-label mapping based on the lease request, and
      storing the client-label mapping and the resource-label mapping in the security label repository to obtain stored security label mappings; and
   a forwarding node configured to authenticate an access request from the client to the computing resource using the stored security label mappings.

2. The commercial grid network of claim 1, further comprising:
   a resource node comprising the computing resource and an accredited security label range, and configured to add the security label to the accredited security label range, wherein the accredited security label range defines an upper security label boundary and a lower security label boundary for accessing the computing resource.

3. The commercial grid network of claim 1, wherein the method further comprises:
   choosing the computing resource to service the lease request based on lease conditions comprised in the lease request.

4. The commercial grid network of claim 1, wherein the forwarding node is configured to authenticate the access request by:
   parsing the access request to obtain the unique identifier of the client and the unique identifier of the computing resource;
   accessing the stored security label mappings based on the unique identifier of the client and the unique identifier of the computing resource;
   verifying that both the client-label mapping and the resource-label mapping have the security label; and
   forwarding the access request based on a positive result of the verifying.

5. The commercial grid network of claim 1, wherein the method further comprises:
   remove the stored security label mappings from the security label repository and returning the security label to the plurality of unmapped security labels when a lease term associated with the client and the computing resource expires.

6. The commercial grid network of claim 1, wherein the method further comprises:
   propagate at least a portion of the security label repository to the forwarding node.

7. A non-transitory computer readable medium comprising executable instructions for:
   receiving a lease request from a client to lease a computing resource selected from a plurality of computing resources in a commercial grid network;
   mapping a unique identifier of the client to a security label selected from a plurality of unmapped security labels to obtain a client-label mapping based on the lease request;
   mapping a unique identifier of the computing resource to the security label to obtain a resource-label mapping based on the lease request;
   storing the client-label mapping and the resource-label mapping in a security label repository to obtain stored security label mappings; and
   authenticating, by the commercial grid network, an access request from the client to the computing resource using the stored security label mappings.

8. The non-transitory computer readable medium of claim 7, further comprising executable instructions for:
   adding the security label to an accredited security label range for the computing resource, wherein the accredited security label range defines an upper security label boundary and a lower security label boundary for accessing the computing resource.

9. The non-transitory computer readable medium of claim 8, wherein the lease request is a request for an exclusive lease of the computing resource, wherein the exclusive lease is enforced by restricting the accredited security label range to only the security label.

10. The non-transitory computer readable medium of claim 7, further comprising executable instructions for:
    choosing the computing resource to service the lease request based on lease conditions comprised in the lease request.

11. The non-transitory computer readable medium of claim 7, wherein executable instructions for authenticating the access request comprises executable instructions for:
    parsing, by a forwarding node in the commercial grid network, the access request to obtain the unique identifier of the client and the unique identifier of the computing resource;
    accessing, by the forwarding node, the stored security label mappings based on the unique identifier of the client and the unique identifier of the computing resource;
    verifying, by the forwarding node, that both the client-label mapping and the resource-label mapping have the security label; and
    forwarding, by the forwarding node, the access request based on a positive result of the verifying.

12. The non-transitory computer readable medium of claim 7, further comprising executable instructions for:
    removing the stored security label mappings from the security label repository and returning the security label to the plurality of unmapped security labels when a lease term associated with the client and the computing resource expires.

13. The non-transitory computer readable medium of claim 7, further comprising executable instructions for:
    propagating at least a portion of the security label repository across a plurality of trusted forwarding nodes in the commercial grid network.

* * * * *